United States Patent Office 2,697,107
Patented Dec. 14, 1954

---

2,697,107

PROCESS OF PREPARING CHLORAMINES OF THE STEROID SERIES

Heinrich Ruschig, Frankfurt am Main Griesheim, and Josef Schmidt-Thomé, Frankfurt am Main Unterliederbach, Germany, assignors to Farbwerke Hoechst Aktiengesellschaft vormals Meister Lucius und Brüning, Frankfurt am Main Hochst, Germany.

No Drawing. Application June 17, 1952,
Serial No. 294,055

Claims priority, application Germany June 20, 1951

4 Claims. (Cl. 260—397.2)

The present invention relates to a process of preparing chloramines of the steroid series.

There has already been described a process of preparing chloramines of the steroid series in U. S. P. 2,286,892, 2,108,646, and in "Medizin und Chemie," volume IV, page 339, according to which steroid amines dissolved in ether are reacted with hypochlorous acid prepared according to Wohl-Goldschmidt (Berichte der Deutschen Chemischen Gesellschaft, volume 46, page 2731 (1913)).

The reaction proceeds according to the following scheme:

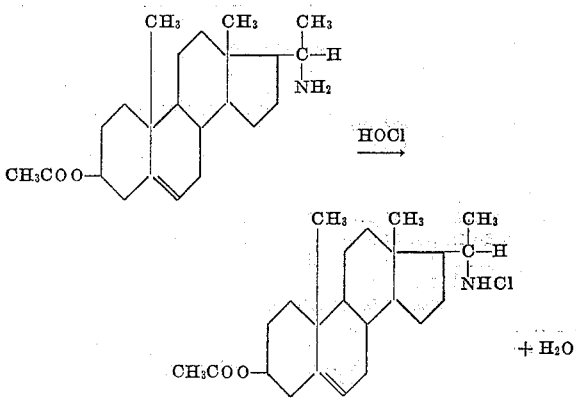

The water formed during the reaction is bound by anhydrous sodium sulfate.

This method of working employed on a small scale gives satisfactory yields; in large scale production, however, the preparation of the anhydrous hypochlorous acid in ether is complicated and time-consuming. A further disadvantage resides in the fact that the ethereal solutions of the hydrochlorous acid decompose so that the solution, after standing for some hours, has first to be titrated in order to determine its content of hypochlorous acid.

Now we have found that the preparation on a large scale of chloramines of the steroid series can be simplified considerably by using N-chlorosuccinimide instead of anhydrous hypochlorous acid. This finding is very surprising as, according to Ziegler (Liebigs Annalen der Chemie, volume 551, page 80) it is known that chlorosuccinimide is extremely slow to react as compared with bromosuccinimide.

N-chlorosuccinimide, for instance, reacts already at room temperature instantaneously with 3-acetoxy-ternorcholenyl-(5)-amine-(20) according to the following scheme:

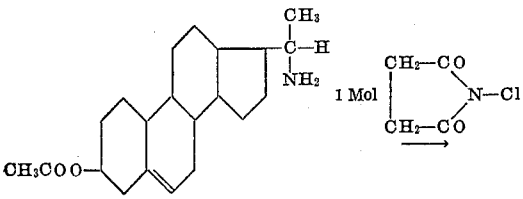

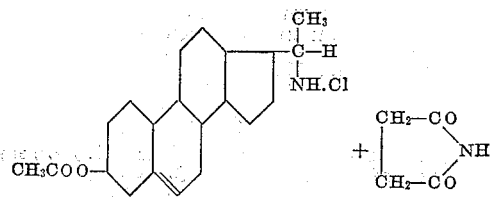

The reaction is advantageously carried out in indifferent organic solvents. As indifferent organic solvents there may be used for instance: benzene, toluene, methylene chloride, chloroform, dioxan, and tetrahydrofurane. Ether is particularly suitable as an indifferent organic solvent. When employing sparingly soluble amines, the reaction may also be carried out in suspension as the reaction products as well as the succinimide are soluble. The reaction is advantageously conducted at room temperature, the components reacting for the most part instantaneously. The reaction can also be carried out at lower temperatures, for instance below 0° C.; however, the reaction time is then correspondingly longer.

As starting material there may be used: steroid amines wherein the amino group is a substituent in the steroid system, especially in the 17-position, and also such steroid amines wherein the amino group is situated in an aliphatic radical forming a substituent in the 17-position of the steroid system, for example: 3-acetoxy-ternorcholenyl-(5)-amine-(20), 3 - hydroxy-androstene-(5)-amine-(17), 3 - acetoxy-bisnorcholanyl-amine-(22), 3 - oxo-17-amino-androstene-(4), cholesterylamine, cholesteryl methylamine, 3-amino-androstene-(5)-ol-(17), and the like. Amino salts may also be used as starting materials, but in this case the amine may first be liberated with the corresponding quantity of alcoholic solution of alkali hydroxide.

As compared to the known method with hypochlorous acid, the process according to the present invention is particularly simple. N-chlorosuccinimide is a stable compound which keeps for an unlimited time. The succinimide which forms during the reaction can be recovered. Moreover, anhydrous sodium sulfate need not be applied as water is not formed when the amines of the steroid series are reacted with N-chlorosuccinimide.

The chloroamines of the steroid series obtained according to the process of the present invention serve as intermediate products. They can be converted into oxo-compounds, for example, by treatment with metal alcoholates and subsequent hydrolysis of the products obtained. In this way there can be obtained, for instance, pregnene-(5)-ol-(3)-one - (20) from 3 - acetoxy - ternor - cholenyl-(5)-amine-(20), dehydroandrosterone from 3-hydroxy-androstene - (5) - amine - (17), oxybisnorcholanaldehyde from 3-acetoxy-bisnorcholanyl-amine-(22), androstenedione from 3- oxo-17-amino-androstene-(4).

The following examples serve to illustrate the invention, but they are not intended to limit it thereto.

*Example 1*

22.6 g. of finely powdered and sieved N-chlorosuccinimide (99%) are added, while stirring, at room temperature to a dried ethereal solution (4 litres) containing 60 g. of 3-acetoxy - ternorcholenyl-(5)-amine-(20). N-chlorosuccinimide dissolves, whereupon the solution shows a neutral reaction. The solution is filtered to remove some flakes and is then concentrated on the water bath to 1.2–1.4 liters, while succinimide crystallizes out. The mixture is filtered with suction, and the mother liquor is, under reduced pressure, concentrated to dryness leaving 3-acetoxy-ternorcholenyl-(5)-chloroamine-(20) as a white crystalline magma. After treatment with metal alcoholates and subsequent hydrolysis it is converted into pregnene-(5)-ol-(3)-one-(20) (Medizin und Chemie, volume IV, page 339).

*Example 2*

185.8 g. of N-chlorosuccinimide (96%) are added, while stirring, at room temperature, to a solution of 480 g. of 3-acetoxy-ternorcholenyl-(5)-amine-(20) in 28 liters of absolute ether. After a short time the solution shows a neutral reaction. Stirring is continued for an additional 30 minutes, the reaction solution is filtered to remove some flakes and is then concentrated on the water bath until crystallization sets in. The mixture is allowed to cool, the succinimide is filtered off with suction, and the clear solution is, under reduced pressure, concentrated to dryness leaving 3-acetoxy - ternorcholenyl-(5)-chloroamine-(20) as a white crystalline magma in a quantitative yield. The product is further treated as described in Example 1.

*Example 3*

2 g. of 3-oxy-androstene-(5)-amine-(17) are suspended in 150 cc. of dry ether, 2 g. of finely powdered N-chlorosuccinimide (87%) are added, and the mixture is stirred for 1½ hours at room temperature during which time the obtained chloramine dissolves whilst the succinimide formed remains undissolved for the most part. The mixture is filtered, half of the ether solution is distilled off and allowed to cool. Further succinimide crystallizes out which is also filtered off. The ether solution is concentrated to dryness leaving 3-hydroxy-androstene-(5)-chloroamine-(17) as a white crystalline magma in a quantitative yield. Recrystallized from aqueous acetone or from ether it melts at 290° C. with decomposition. It is stable and can be stored for a long time. Further processing to dehydro-androsterone is performed by treatment with metal alcoholates and subsequent hydrolysis according to "Medizin und Chemie," volume IV, page 341 or according to U. S. Patent 2,286,892.

*Example 4*

13.4 g. of N-chlorosuccinimide (99%) are added, while stirring, at room temperature to a solution of 36.1 g. of 3-acetoxy-ternorcholanyl-amine-(20) in 3 liters of absolute ether. After a short time the solution shows a neutral reaction. Stirring is continued for an additional 30 minutes, the reaction solution is filtered and then concentrated on the water bath until crystallisation sets in. After cooling, the precipitated succinimide is filtered off with suction, and the filtrate is, under reduced pressure, evaporated to dryness leaving 3-acetoxy-ternorcholanyl-chloroamine-(20) as a white crystalline magma.

It can be converted into pregnanolone according to the process described in U. S. Patent 2,286,892.

*Example 5*

3.75 g. of 3-acetoxy-bisnorcholanyl-amine-(22) are dissolved in absolute ether, and to this solution are added, while stirring and cooling with ice, 1.34 g. of N-chlorosuccinimide (99%). The mixture is stirred for an additional 30 minutes. The ether solution is then concentrated and cooled. The succinimide that has crystallized out is filtered off, and the ether solution is evaporated to dryness. The chloryl compound of the 3-acetoxy-bis-norcholanyl-amine-(22) is obtained as an amorphous substance in a quantitative yield.

*Example 6*

To a solution of 2.87 g. of 3-oxo-17-amino-androstene-(4) in 1 liter of absolute ether there are added at a temperature of —5° C., while stirring vigorously, 1.34 g. of N-chlorosuccinimide. After a short time the solution shows a neutral reaction and is then concentrated. On cooling, the formed succinimide separates. After filtering, the ether solution is evaporated to dryness. 3-oxo-17-chloro-amino-androstene-(4) is obtained in a practically quantitative yield.

It can be converted into androstenedione according to the process described in U. S. Patent 2,286,892.

*Example 7*

3.85 g. of cholesterylamine are dissolved in ether and, while stirring, there are added 1.34 g. of N-chlorosuccinimide at room temperature. Stirring is continued for some time, the mixture is filtered, and the solution is then concentrated. On cooling, the precipitated succinimide is filtered off with suction, and the filtrate is evaporated to dryness. Cholesteryl-chloroamine is obtained in a quantitative yield.

Cholestenone can be obtained from cholesteryl-chloroamine by heating with a solution of sodium alcoholate and allowing the reaction mixture to stand after acidifying with sulfuric acid according to the process described in U. S. Patent 2,286,892.

*Example 8*

2.87 g. of 3-amine-androstene-(5)-ol-(17) are dissolved in absolute ether and to the solution are added, while stirring, 1.34 g. of N-chlorosuccinimide. The solution is concentrated, allowed to cool, and filtered. Subsequently the filtrate is evaporated to dryness. 3-chloroamino-androstene-(5)-ol-(17) is obtained which can be converted into testosterone by treating with metal alcoholates and subsequent hydrolysis according to the process described in "Medizin und Chemie," volume 4, page 341.

Chloroform or methylene chloride can also be used as solvents instead of ether.

*Example 9*

4.0 g. of cholesterylmethylamine are dissolved in absolute ether and 1.35 g. of N-chlorosuccinimide are added, while stirring vigorously. The ether solution is concentrated, the succinimide precipitated on cooling is filtered off with suction, and the filtrate is evaporated to dryness. The chloryl compound of cholesteryl methylamine is obtained as colorless crystals in a quantitative yield.

The compound obtained can be converted into cholestenone by further processing it according to the process of U. S. Patent 2,286,892.

Dioxan or tetrahydrofurane can also be used as solvents instead of ether.

We claim:
1. The process of preparing amines of the steroid series chlorinated in the amino group, which comprises reacting, in an organic solvent, N-chlorosuccinimide with amines of the steroid series.
2. The process of preparing amines of the steroid series chlorinated in the amino group, which comprises reacting, in an organic solvent, N-chlorosuccinimide with amines of the steroid series, wherein the amino group is a nuclear substitutent in the steroid system.
3. The process of preparing amines of the steroid series chlorinated in the amino group, which comprises reacting, in an organic solvent, N-chlorosuccinimide with an amine of the steroid series, wherein the amino group is situated in the 17-position of the steroid system.
4. The process of preparing amines of the steroid series chlorinated in the amino group, which comprises reacting, in an organic solvent, N-chlorosuccinimide with amines of the steroid series, wherein the amino group is situated in an aliphatic radical forming a substituent in the 17-position of the steroid system.

References Cited in the file of this patent

UNITED STATES PATENTS

| Number | Name | Date |
|---|---|---|
| 2,286,892 | Bockmuhl | June 16, 1942 |
| 2,531,688 | Jones | Nov. 28, 1950 |